(12) United States Patent
Hertzog et al.

(10) Patent No.: US 9,560,844 B2
(45) Date of Patent: Feb. 7, 2017

(54) MAGNETICALLY ATTACHABLE SPRAY APPARATUS

(71) Applicants: James N Hertzog, Butler, MO (US); George W Steinmeir, Kansas City, MO (US)

(72) Inventors: James N Hertzog, Butler, MO (US); George W Steinmeir, Kansas City, MO (US)

( * ) Notice: Subject to any disclaimer, the term of this patent is extended or adjusted under 35 U.S.C. 154(b) by 189 days.

(21) Appl. No.: 14/507,537

(22) Filed: Oct. 6, 2014

(65) Prior Publication Data

US 2016/0095304 A1   Apr. 7, 2016

(51) Int. Cl.
*B05B 15/06* (2006.01)
*A01M 7/00* (2006.01)
*B05B 9/01* (2006.01)

(52) U.S. Cl.
CPC ........... *A01M 7/005* (2013.01); *A01M 7/0032* (2013.01); *A01M 7/0042* (2013.01); *A01M 7/0082* (2013.01); *A01M 7/0085* (2013.01); *B05B 9/01* (2013.01); *B05B 15/061* (2013.01); *B05B 15/066* (2013.01)

(58) Field of Classification Search
CPC .. A01M 7/005; A01M 7/0042; A01M 7/0085; A01M 7/0082; A01M 7/0032; B05B 9/01; B05B 15/061; B05B 15/066
USPC ....... 239/525, 526, 200, 273, 282, 146, 172, 239/175, 176, 587.1, 587.5, 587.6, 239/DIG. 11; 248/206.5, 75, 683
See application file for complete search history.

(56) References Cited

U.S. PATENT DOCUMENTS

| | | | | |
|---|---|---|---|---|
| 2,939,671 A * | 6/1960 | Beekman | ................. | F16L 3/00 248/683 |
| 3,228,613 A * | 1/1966 | Goldstein | ............... | A47L 13/26 239/DIG. 11 |
| 5,100,058 A * | 3/1992 | Wei | ....................... | B05B 1/3046 239/526 |
| 8,186,366 B2 * | 5/2012 | Montoya | ............... | B05B 15/061 239/587.5 |

* cited by examiner

*Primary Examiner* — Steven J Ganey
(74) *Attorney, Agent, or Firm* — Intellectual Property Center, LLC; Arthur K. Shaffer

(57) ABSTRACT

The present invention provides an improved magnetically attachable spray apparatus with a spray body extending between an angled mounting surface and a spray means, the angled mounting surface being generally secured to and supported by a magnetically attachable base which is moveable between a horizontal and a vertical configuration.

15 Claims, 7 Drawing Sheets

MAGNETICALLY ATTACHABLE SPRAY APPARATUS

FIELD OF THE INVENTION

The present invention is broadly directed to improvements in spraying apparatus secured to a vehicle for spraying herbicides or pesticides.

BACKGROUND OF THE INVENTION

The economic loss due to fly infestation in cattle herds has been well documented. Depending on the type of fly and class of cattle, reported economic losses vary but the general consensus is that the problem can result in millions of dollars lost to decreased weight gain and required veterinary treatments as a result of the infestation. Common ways in which the flies reduce performance is through interference of weight gain because cattle extend energy and time at fly control, loss of blood from the infestation, or through disease or injury from the fly. Some cows have hundreds even thousands of flies surrounding them at any given time. These flies can bite, annoy and spread disease to the cow resulting in injury, disease and weight loss to the cow.

Several methods, and many products within those methods, have been used in an attempt to control flies. These methods include slow-release ear tags, sprays, rubs, dusts, feedthrough and boluses. The most common methods seem to be ear tags, sprays and rubs. The chemicals that these methods deliver include pyrethroids, organophosphates (OPs), organochlorines and endectocides. Typical spraying apparatuses seem to be based upon using standard agriculture field sprayers which have sprayer extending from a foldable, extendable, hingeable or retractable boom. The boom is generally fastened to the frame of the vehicle and is transported over the ground, by means of the vehicle, for the application of spray liquid. The spray line may have a plurality of discharge openings, which are connect to a pump and a spray nozzle, and the spray liquid is routed from the spray line into the spray nozzle by actuation of the pump. These booms are problematic in that they are not properly positioned for applying the insecticides or pesticides. In addition, these booms are often difficult to use and limit the vehicle's maneuverability and operation and when utilized are difficult to setup and take down requiring excess time and effort in the farmer's limited workday.

Some spraying apparatus utilize a handheld wand sprayer which must be handheld and extending out the driver's side window and manually operated during simultaneous operation of the vehicle by the driver of the vehicle. These are unsafe and often cause the sprayed fluid to fall back on the driver during operation of the vehicle.

SUMMARY OF THE INVENTION

The present invention is an improved magnetically attachable spray apparatus with a spray body extending between an angled mounting surface and a spray means, the angled mounting surface being generally secured to and supported by a base, the based being magnetically attachable during a spray operation. The spray body being fluidically connected to a coiled hose which transports fluid from a fluid reservoir to the spray means for application in an agricultural operation.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

DETAILED DESCRIPTION OF THE INVENTION

Figure 1:
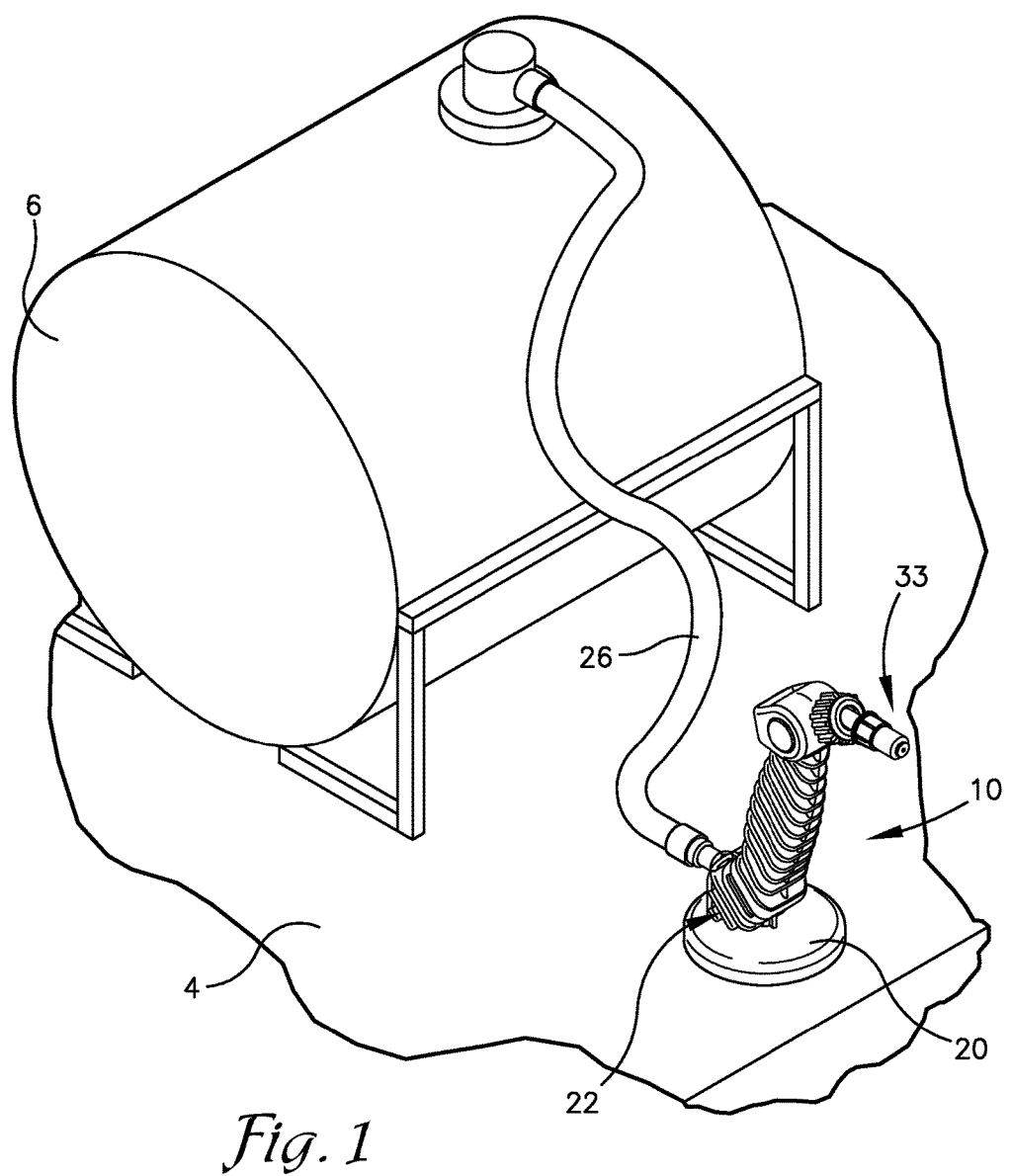
FIG. 1 is a right side perspective of the improved magnetically attachable spray apparatus illustrated on a horizontal structure with a fluid delivery system.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 10 generally designates an embodiment of the improved magnetically attachable spray apparatus, with a magnetically attachable base 20, an angled mounting surface 22 extending upwardly therefrom. A hose 26 transmits fluid from a fluid reservoir or tank 6 to the improved magnetically attachable spray apparatus 10. An exemplary rotatable agricultural spray system 8 includes spray apparatus 10, hose 26 and tank 6 which include features further described below and which are used to treat agricultural products with the desired fluid contained within the tank 6 from a agricultural vehicle (not shown) having the illustrated horizontal support 4.

An end of the hose 26 is connectably secured to the tank 6 and transmits fluid therefrom to the magnetically attachable spray apparatus 10 which generally includes the angled mounting surface 22 in fluid communication with spray member 30 at a proximate end thereof, the distal end thereof being in fluid communication with a spray head 31 including a spray means 33 spaced from and opposite the angled mounting surface 22. The embodiment of the spray member 30 depicted in FIGS. 1-4, 6-7 includes a plurality of angled ribs extending circumferentially along the spray member 30 which is also referred to herein as a ribbed spray member 30. However, the spray apparatus 10 may include a ribbed or non-ribbed spray member 30 having the features further described herein. In operation, the ribbed spray member 30 transmits the received fluid from the angled mounting surface 22 towards the spray head 31 for dispersement outwardly and therefrom. The illustrated spray apparatus 10 is vertically and horizontally adjustable with the ribbed spray member 30 being selectively rotated about an angular axis presented by a substantially planar front surface 22b and extending laterally from the base 20, normal to the substantially planar front surface 22b which is associated with the housing 48 of the angled mounting surface 22. With the base 20 being horizontally disposed, the rotated ribbed spray member 30 extends laterally in alignment with the angular axis in the horizontal configuration of the spray apparatus 10, the spray head 31 being generally rotatable with the spray means 33 being angularly adjustable generally along the angular axis, in a generally vertical direction, for selective dispensing of the transmitted fluid upon the underlying agricultural product.

The rotation of the ribbed spray member 30 in relation to the angled mounting surface 22 and rotation of the spray head 31 facilitates operation of the spray apparatus 10 between and including horizontal and vertical configurations and provides for a variety of operational characteristics for use in a variety of agriculture spray configurations and operations which are not available with some traditional agriculture spraying devices like boom spray systems. In operation, as the ribbed spray member 30 is rotated in relation to the angled mounting surface 22 the magnetic mounting base 20 is operated from the bottom for use in a generally horizontal configuration towards the side and then towards the rear of the apparatus 10 for use in a generally vertical configuration.

Figure 2:
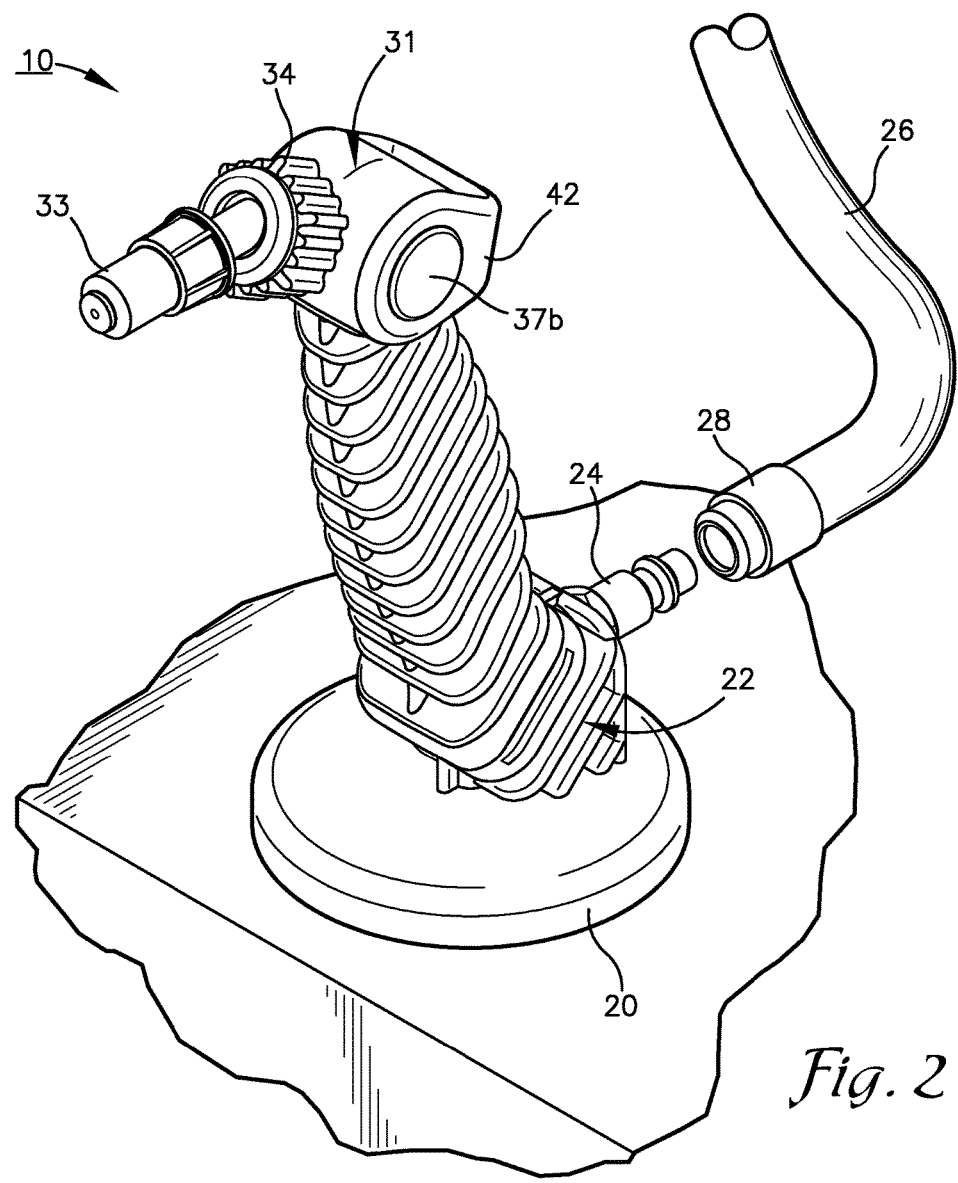
FIG. 2 is left side perspective of the embodiment illustrated in FIG. 1 mounted on the horizontal structure and being adapted for receipt of a hose.

As depicted in the illustrated embodiment of FIG. 2, the improved magnetically attachable spray apparatus 10, also referred to herein as the spray apparatus 10 is mounted horizontally by base 20 with the spray head 31 extending angularly therefrom. The illustrated spray apparatus 10 is shown with a receiver connection 24 extending rearwardly from the angled mounting surface 22, the receiver connection 24 being generally adapted for mechanical coupling with hose coupling assembly 28 associated with an end of hose 26.

Figure 7:
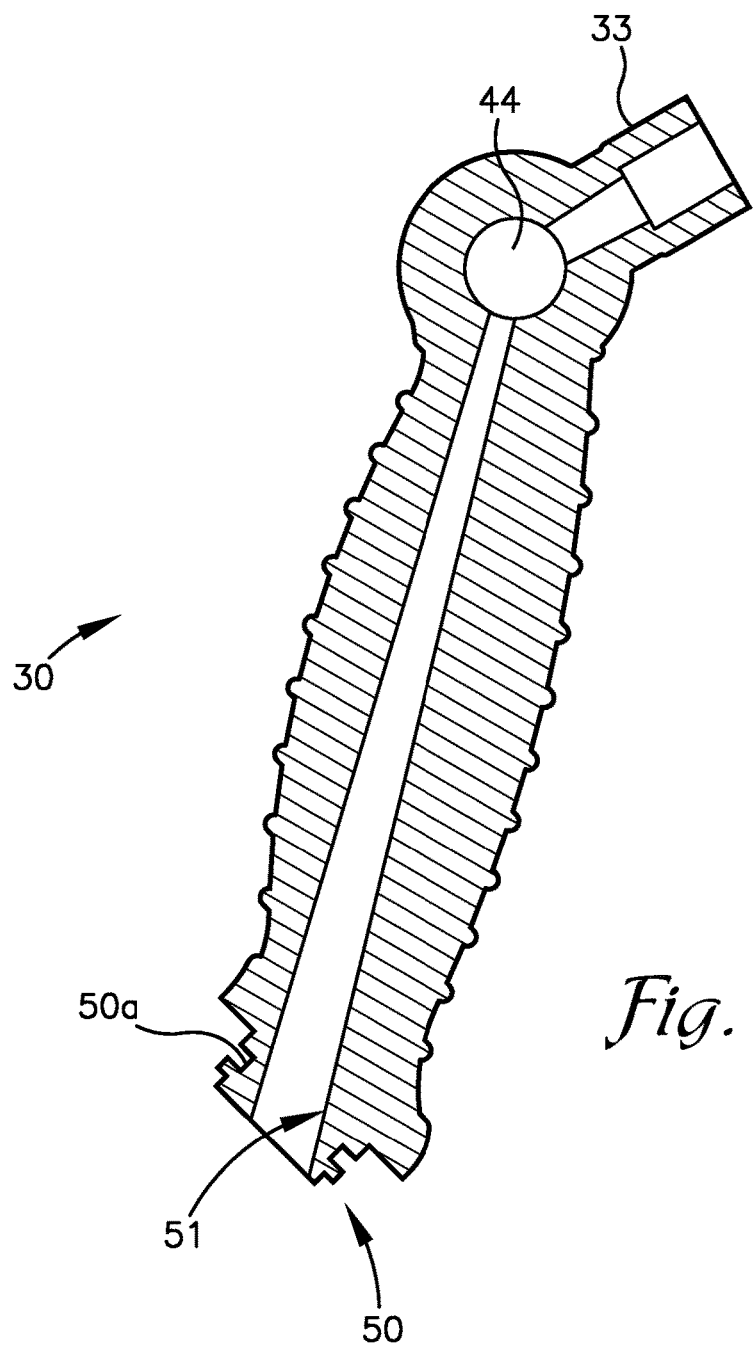
FIG. 7 is a cross-sectional view of a ribbed spray member and spray head taken along line 7-7 in FIG. 4.

As further illustrated in FIG. 7, the ribbed spray member 30 includes an internally located fluid conduit 51 that extends from an interconnecting structure 50 towards the spray head 31 the interconnecting structure 50 being generally adapted for receipt by the angled mounting surface 22. The interconnecting structure 50 depicted in FIG. 7 is generally located at a proximate end of the ribbed spray member 30 opposite the spray head 31 and adapted generally for receipt by the angled mounting surface 22 within housing 48.

The illustrated interconnecting structure 50 depicted in FIG. 7 generally includes an outwardly extending male structure for releasable receipt by a complementary female structure associated with housing 48. In operation, the interconnecting structure 50 is mechanically fastened to the angled mounting surface 22, although other securing means may be utilized. The fastening mechanism depicted in FIG. 7 is a mechanical fastener utilizing a pair of clip legs 49b emanating from clip 49 which is generally received by the interconnecting structure 50 at a connecting groove pair 50a. The depicted fastening mechanism secures the ribbed spray member 30 within the housing 48 while maintaining fluidic communication therebetween. In an exemplary operation, the interconnecting structure 50 allows for rotation of the ribbed spray member 30 in relation to the angled mounting surface 22 without removal of the clip 49 or disassembly of the interconnecting structure 50 from the housing 48.

Figure 5:
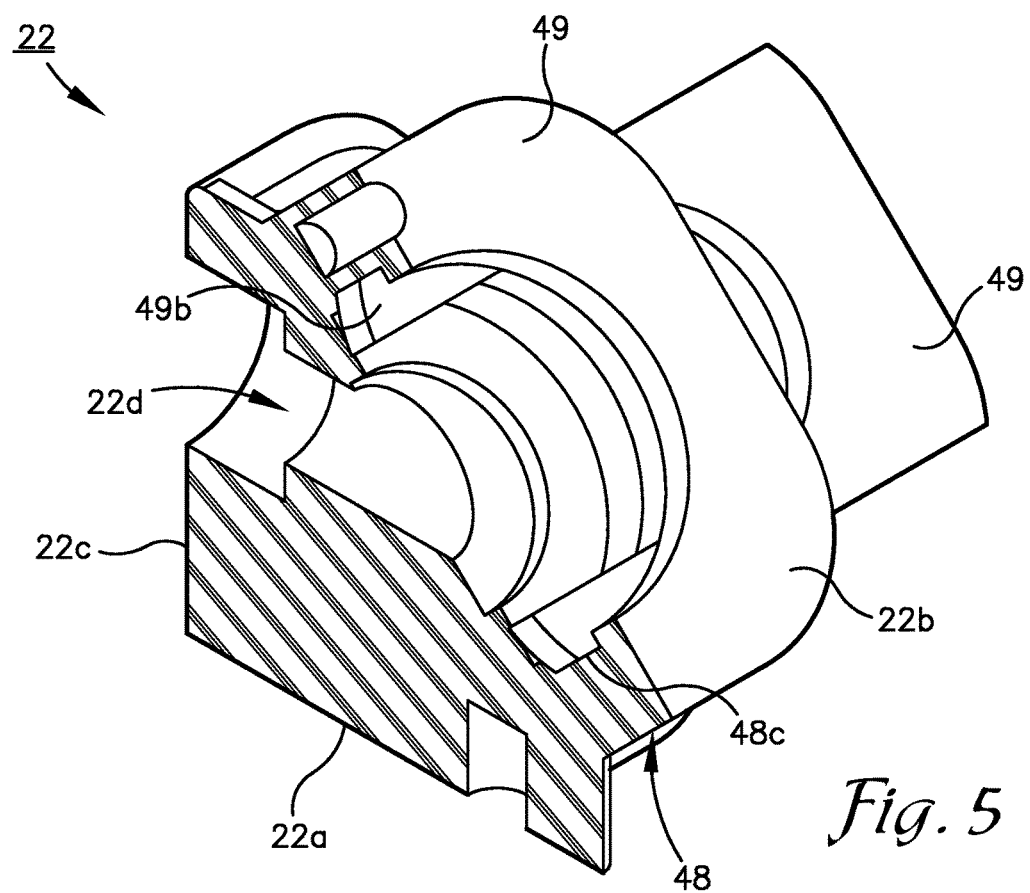
FIG. 5 is a cross sectional view taken along line 5-5 in FIG. 4.

The spray head 31 is in fluidic communication with the tank 6 during receipt by the hose coupling assembly 28 of the receiver connector 24. During agricultural spraying of the fluid from the tank 6 upon the agricultural product, the fluid may travel through the hose 26, through the angled fluid conduit 22d (depicted in FIG. 5), into the fluid conduit 51 (depicted in FIG. 7) and angularly outward through the spray means 33 of spray head 31.

Figure 4:
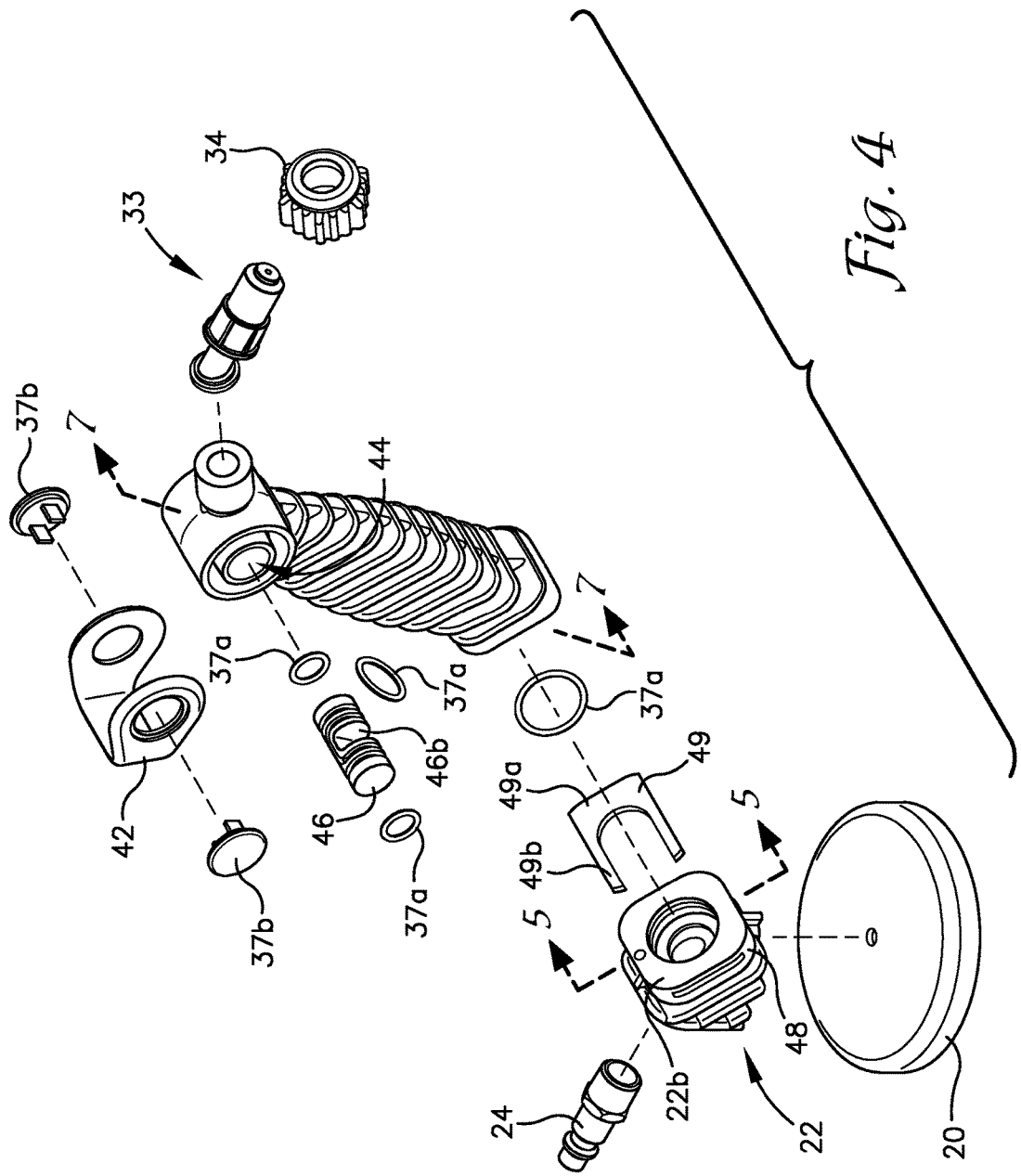
FIG. 4 is an exploded perspective view of the embodiment illustrated in FIG. 3.

The spray head 31 illustrated in FIG. 4 is generally cylindrical with an inner and an outer ring coaxially orientated and adapted for receipt of the mechanical fastener 37b therebetween. While the spray head 31 is illustrated as cylindrical, other configurations are known and should be considered within the scope of the present invention. During operation, the spray head 31 rotates the spray means 33 between an upper and a lower position, the upper and lower position being separated angularly from each other. Spray head 31 also includes a head bracket 42 which when positioned on the spray head 31 presents a central canal 44 therebetween having a central canal axis (not illustrated) which extends through the spray head 31 and is aligned normal or perpendicular to the fluid conduit 51 depicted in FIG. 7. In general, the central canal 44 is adapted for receiving a fluidic axle 46 with a slotted opening 46b which provides for fluidic transmission between the spray means 33 and the receiver connection 24 during the spray operation as the spray head 31 is rotated. The slotted opening 46b is illustrated as semi-circular but may alternatively be configured while ensuring fluid transmission through the spray means 33. Spraying means 33 being generally known may include, but is not limited to, a nozzle which is adjusting the volume of fluid or air or for mixing air with the received fluid to produce the desired spray pattern for applying on the desired agriculture product such as but not limited to livestock or vegetation.

In the illustrated embodiment, the spray head 31 rotates about the central canal axis (not shown) which is generally aligned with the central canal 44. The rotation of the spray head 31 allows for selective angular operation of the improved spray apparatus 10 during the agricultural spray operation. As illustrated in FIGS. 1-4, 6 the spray means 33 includes an adjustment ring 34 which allows for manipulation of the flow characteristics of the transmitted fluid such as control of the volume, shape, velocity or dispersion of the sprayed fluid upon the selected agricultural product. A variety of securing or sealing components may also be utilized within the spray head 31 as desired such as O-rings 37a and mechanical fasteners 37b. As illustrated in FIG. 4, the fluidic axle 46 may include a pair of outer circular grooves 46c and an inner U-shaped groove 46b with each being adapted for receipt of the O-rings 37a, to provide a hermetic seal during operation of the spray head 31 while providing fluid communication through the slotted opening 46b.

Although specific configurations of the angled mounting surface 22 may vary from the illustrated embodiment, depending on the desired spray characteristics and vehicle characteristics to which the sprayer is generally attached during operation, in the illustrated embodiment, the angled mounting surface 22 includes a generally pyramidal form with a bottom surface 22a adapted for fastening to the magnetic base 20, a front surface 22b extending from the bottom surface 22a towards housing 48 and a rear surface 22c extending from the opposite side of the bottom surface 22a and associated with the receiver connection 24. Generally, the angled mounting surface 22 presents an angled fluid conduit 22d which extends there through from the rear surface 22c towards housing 48 associated with the front surface 22b for fluidic communication between the receiver connection 24 and the housing 48.

Figure 6:
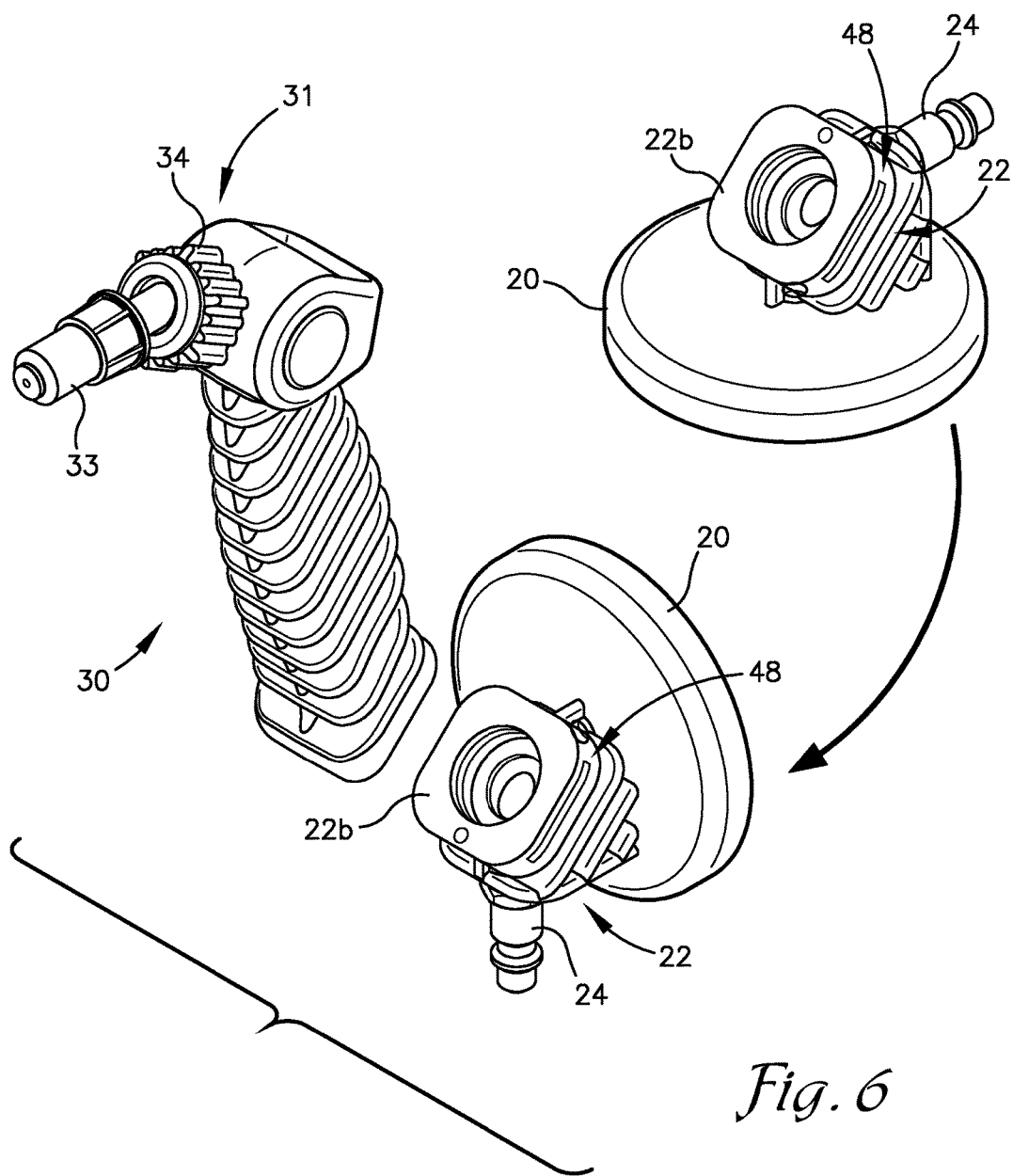
FIG. 6 is a right perspective of the embodiment illustrated in FIG. 2 transitioning from a horizontal configuration to a vertical configuration.

The housing 48 provides for fastening of the ribbed spray member 30 by the angled mounting surface 22. The embodiment of the housing 48 illustrated in FIGS. 1-6 is generally rectangular and includes for example, a slotted opening 48a adapted for receipt of clip 49 for mechanical fastening the ribbed spray member 30 to the angled mounting surface 22. In the exemplary embodiment, the clip 49 is inserted through the slotted opening 48a, along the groove pair 48c (depicted in FIG. 5), each groove being associated with opposite sides of the housing 48 for frictional receipt of the clip 49. In operation, the housing 48 receives the interconnecting structure 50 of the ribbed spray member 30 which is secured by clip 49 to the angled mounting surface 22 while allowing for rotation of the ribbed spray member 30 about the angular mounting surface 22 as the improved spray apparatus 10 transitions from a horizontal configuration to vertical configuration an example of which is illustrated in FIG. 6. By way of example and not as a limitation, the illustrated clip 49 includes a curved section 49a adapted for secured receipt of the interconnecting structure 50 which extends downwardly from the ribbed spray member 30 which is illustrated in FIG. 7. The clip legs 49b extend distally from the curved section 49a of clip 49 as illustrated in FIG. 4.

The magnetic mounting base 20 allows for use of the spray apparatus 10 in connection to a mounting surface associated with a customary agricultural vehicle (not shown) such as a truck with a horizontal flatbed 4 without any specialized boom structures extending from the vehicle during movement of the vehicle over or around the agricultural product. In operation, the magnetically attachable base 20 is adapted for magnetic attachment to the mounting surface of the vehicle (not shown) and may include a magnetized surface or a metallic surface receptive to a magnetic surface associated with the vehicle. In addition, while the magnetically attachable base 20 is illustrated in FIGS. 1-4, 6 as being round, other configurations which are generally known are considered within the scope of the present invention. As depicted, the magnetically attachable base 20 includes a outer metallic surface in receipt of an inner magnet 18 having sufficient properties for magnetic connection during the agricultural spraying activity, for example, spraying herbicides or pesticides in an agricultural setting such as in treating cattle or treating crops for insects, disease and/or pests.

Figure 3:
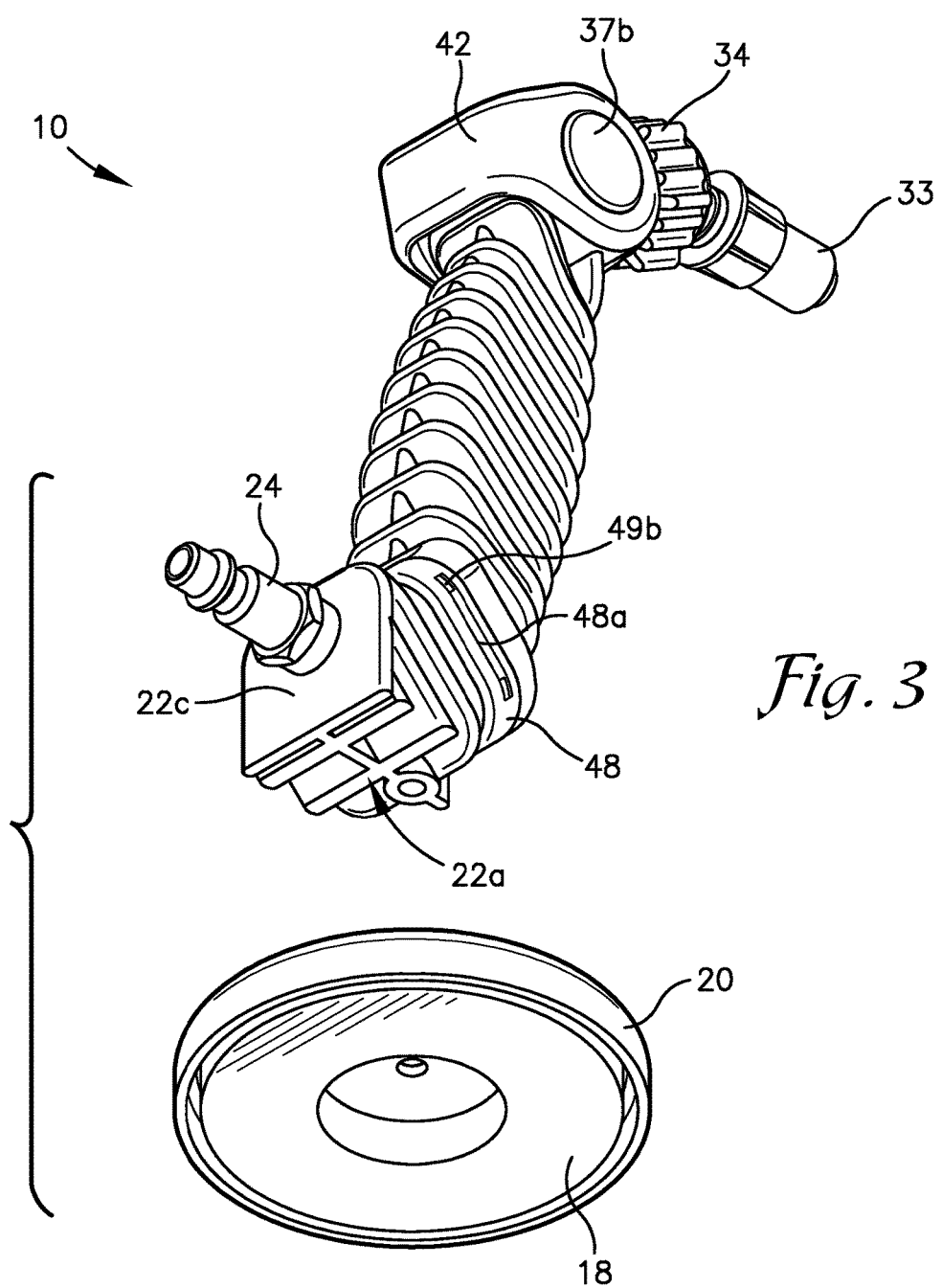
FIG. 3 is rear perspective of the embodiment illustrated in FIG. 1.

An exemplary base 20 is illustrated in FIG. 3 with the inner magnet 18 being generally received by the base 20 may and include an optional central aperture for a mechanical fastener which may be used to secure the angled mounting surface 22 to base 20. Generally, the magnetically attachable base 20 is movable between a horizontal configuration and a vertical configuration for attachment between and including a vertical and horizontal position with the inner magnet 18. Alternatively, a magnetic surface may be associated with the vehicle sidewall for placement of a magnetically receptive base including a magnetically reactive material for securing the spray apparatus 10 during use. Alternatively, the spraying apparatus 10 may be magnetically secured to a sidewall of the tank 6 for operation during movement of the vehicle. The tank 6 may include a magnetically reactive surface or alternatively, provided a magnetic surface for receipt of the magnetically reactive base associated with the spraying apparatus 10. In this way, the spraying apparatus 10 may be secured to the vehicle or tank during movement of the vehicle for treating the agriculture product. Alternatively, a plurality of spraying apparatuses 10 may be positioned along the vehicle or tank for treating the agriculture product with a plurality of hose connectors 28 to disperse fluid from the tank 6 to each of the spraying apparatus 10. Additionally and alternatively, a vertically configured spraying apparatus 10 may be secured to a vehicle sidewall (not shown) or vehicle door (not shown) during the spraying operation, the spraying apparatus 10 being in fluid communication with the tank 6.

It is to be understood that while certain forms of the present invention have been illustrated and described herein, it is not to be limited to the specific forms or arrangement of parts described and shown.

What is claimed and desired to be secured by Letters Patent:

1. An improved spray apparatus for spraying a fluid from a reservoir associated with a vehicle upon an agricultural product, said spray apparatus comprising:
    a magnetic base having a vertical and a horizontal configuration and adapted for being magnetically fastened to a mounting surface associated with said vehicle;
    an angled mounting surface secured to the magnetic base having an angled fluid conduit;
    said angled mounting surface having an front surface presenting an angular axis extending from the magnetic base laterally towards a spray member;
    said spray member connectably secured to said angled mounting surface along said angular axis and presenting a fluid conduit in fluidic communication with said angled fluid conduit;
    a spray bead in fluidic communication with said angled fluid conduit through said fluid conduit and extending from said spray member;
    a spray means extending angularly from said spray head for spraying fluid received from the reservoir upon the agricultural product during movement of the vehicle;
    said front surface presenting a housing for receiving said spray member; and
    said housing further comprises a slotted opening for receipt of a mechanical fastener for releasably securing said spray member to said angled mounting surface.

2. The improved spray apparatus of claim 1 wherein said spray apparatus is rotatable from a horizontal to a vertical configuration.

3. The improved spray apparatus of claim 1, said spray member further comprising a plurality of ribs.

4. The improved spray apparatus of claim 1, wherein said housing receives an interconnecting structure extending from said spray member.

5. The improved spray apparatus of claim 1 wherein said spray member is rotatable about said angular axis in relation to said angled mounting surface.

6. The improved spray apparatus of claim 1, said angled mounting surface further comprising:
    a bottom surface secured to said magnetic base and secured at one end to said front surface; and
    a rear surface extending from said bottom surface, opposite said front surface and presenting a receiver connection, whereby said angled fluid conduit extends from said rear surface to said front surface for fluid communication with said fluid conduit.

7. The improved spray apparatus of claim 1 wherein said spray head further comprises:
    a head bracket presenting a central canal in fluidic communication with said fluid conduit; and
    a fluidic axle received within said central canal and having a fluidic opening for transmission of fluid through said spray means, whereby said spray means is adjusted by rotation of said spray head during spraying of the fluid received from the reservoir upon the agricultural product during movement of the vehicle.

8. An improved spray apparatus for spraying a fluid from a reservoir associated with a vehicle upon an agricultural product, said spray apparatus comprising:

a magnetic base having a vertical and a horizontal configuration and adapted for being magnetically fastened to a mounting surface associated with said vehicle;

an angled mounting surface secured to the magnetic base having an angled fluid conduit;

said angled mounting surface having an front surface presenting an angular axis extending from the magnetic base laterally towards a spray member;

said spray member connectably secured to said angled mounting surface along said angular axis and presenting a fluid conduit in fluidic communication with said angled fluid conduit;

a spray head in fluidic communication with said angled fluid conduit through said fluid conduit and extending from said spray member;

a spray means extending angularly from said spray head for spraying fluid received from the reservoir upon the agricultural product during movement of the vehicle; and said angled mounting surface further comprising:

a bottom surface secured to said magnetic base and secured at one end to said front surface; and a rear surface extending from said bottom surface, opposite said front surface and presenting a receiver connection, whereby said angled fluid conduit extends from said rear surface to said front surface for fluid communication with said fluid conduit.

9. The improved spray apparatus of claim 8 wherein said spray apparatus is rotatable from a horizontal to a vertical configuration.

10. The improved spray apparatus of claim 8, said spray member further comprising a plurality of ribs.

11. The improved spray apparatus of claim 8, said front surface presenting a housing for receiving said spray member.

12. The improved spray apparatus of claim 11, wherein said housing receives an interconnecting structure extending from said spray member.

13. The improved spray apparatus of claim 11, wherein said housing further comprises a slotted opening for receipt of a mechanical fastener for releasably securing said spray member to said angled mounting surface.

14. The improved spray apparatus of claim 8 wherein said spray member is rotatable about said angular axis in relation to said angled mounting surface.

15. The improved spray apparatus of claim 8 wherein said spray head further comprises:

a head bracket presenting a central canal in fluidic communication with said fluid conduit; and a fluidic axle received within said central canal and having a fluidic opening for transmission of fluid through said spray means, whereby said spray means is adjusted by rotation of said spray head during spraying of the fluid received from the reservoir upon the agricultural product during movement of the vehicle.

* * * * *